(12) United States Patent
Liu (10) Patent No.: US 9,756,582 B2
(45) Date of Patent: Sep. 5, 2017

(54) BROADCASTING, AND SCANNING FOR WIRELESS COMMUNICATION

(71) Applicant: Beijing Zhigu Rui Tuo Tech Co., Ltd, Beijing (CN)

(72) Inventor: Jia Liu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/100,294

(22) PCT Filed: Nov. 6, 2014

(86) PCT No.: PCT/CN2014/090436
§ 371 (c)(1),
(2) Date: May 27, 2016

(87) PCT Pub. No.: WO2015/078277
PCT Pub. Date: Jun. 4, 2015

(65) Prior Publication Data
US 2017/0006556 A1    Jan. 5, 2017

(30) Foreign Application Priority Data
Nov. 30, 2013  (CN) .......................... 2013 1 06324052

(51) Int. Cl.
*H04W 52/32*        (2009.01)
*H04W 52/14*        (2009.01)
(Continued)

(52) U.S. Cl.
CPC ....... *H04W 52/322* (2013.01); *H04W 52/143* (2013.01); *H04W 52/228* (2013.01); *H04W 52/245* (2013.01); *H04W 4/008* (2013.01)

(58) Field of Classification Search
CPC .................. H04W 52/00–52/60; H04W 4/008
(Continued)

(56) References Cited

U.S. PATENT DOCUMENTS

| 2010/0008277 A1 | 1/2010 | Kopikare et al. |
| 2013/0094491 A1* | 4/2013 | Sun ............... H04W 52/383 370/345 |

FOREIGN PATENT DOCUMENTS

| CN | 101154970 A | 4/2008 |
| CN | 101965041 A | 2/2011 |

(Continued)

OTHER PUBLICATIONS

Bluetooth SIG. "Bluetooth Core Specification Version 4.0", Jun. 30, 2010, published online at [https://www.bluetooth.org/docman/handlers/downloaddoc.ashx?doc_id=229737], retrieved on May 27, 2016, 2302 pages.

(Continued)

*Primary Examiner* — Raymond Dean
(74) *Attorney, Agent, or Firm* — Amin, Turocy & Watson, LLP (57) ABSTRACT

Resulting in a reduction of communication power consumption, a broadcasting method can comprise sending a broadcasting packet by using a current power and listening; when a request is detected by means of listening, recording the current power as a historical power, and decreasing the current power; and determining whether a current broadcasting event is ended, if the current broadcasting event is ended, determining the historical power as a reference working power, and otherwise, returning to the broadcasting and listening. A scan method can comprise: performing scan and listening; when a broadcasting packet is detected by means of listening, if a request has been sent to a sender of the broadcasting packet and a received signal strength of the broadcasting packet changes, adjusting a first transmit power; and sending the request to the sender of the broadcasting packet according to the adjusted first transmit power.

15 Claims, 7 Drawing Sheets

(51) Int. Cl.
*H04W 52/24* (2009.01)
*H04W 52/22* (2009.01)
*H04W 4/00* (2009.01)

(58) Field of Classification Search
USPC .................................. 455/522, 574; 370/318
See application file for complete search history.

(56) References Cited

FOREIGN PATENT DOCUMENTS

| | | | |
|---|---|---|---|
| CN | 103179655 | A | 6/2013 |
| CN | 103702391 | A | 4/2014 |
| EP | 1443720 | A2 | 8/2004 |
| EP | 1972174 | A1 | 9/2008 |
| WO | 2013108114 | A1 | 7/2013 |

OTHER PUBLICATIONS

International Search report for PCT Patent Application No. PCT/CN2014/090436, dated Feb. 9, 2015, 2 pages.

\* cited by examiner

BROADCASTING, AND SCANNING FOR WIRELESS COMMUNICATION

RELATED APPLICATION

The present application is a U.S. National Stage filing under 35 U.S.C. §371 of international patent cooperation treaty (PCT) application No. PCT/CN2014/090436, filed Nov. 6, 2014, and entitled "BROADCASTING, AND SCANNING FOR WIRELESS COMMUNICATION", which claims the benefit of priority to Chinese Patent Application No. 201310632405.2, filed on Nov. 30, 2013, which applications are hereby incorporated into the present application by reference herein in their respective entireties.

TECHNICAL FIELD

The present application relates to the field of communications, and in particular, to a broadcasting for wireless communication, and scanning for wireless communication.

BACKGROUND

In a wireless communications network, a common application scenario is as follows: a first wireless device scans many other wireless devices to discover a second wireless device, a data connection is established and maintained between the first wireless device and the second wireless device, and when data needs to be transmitted, data transmission is performed. For example, a smart phone of a user may discover a smart watch by means of Bluetooth scan, and then a communication connection is established and maintained; when receiving an SMS message, the smart phone can send the SMS message to the watch so that the watch displays the SMS message.

Figure 1:
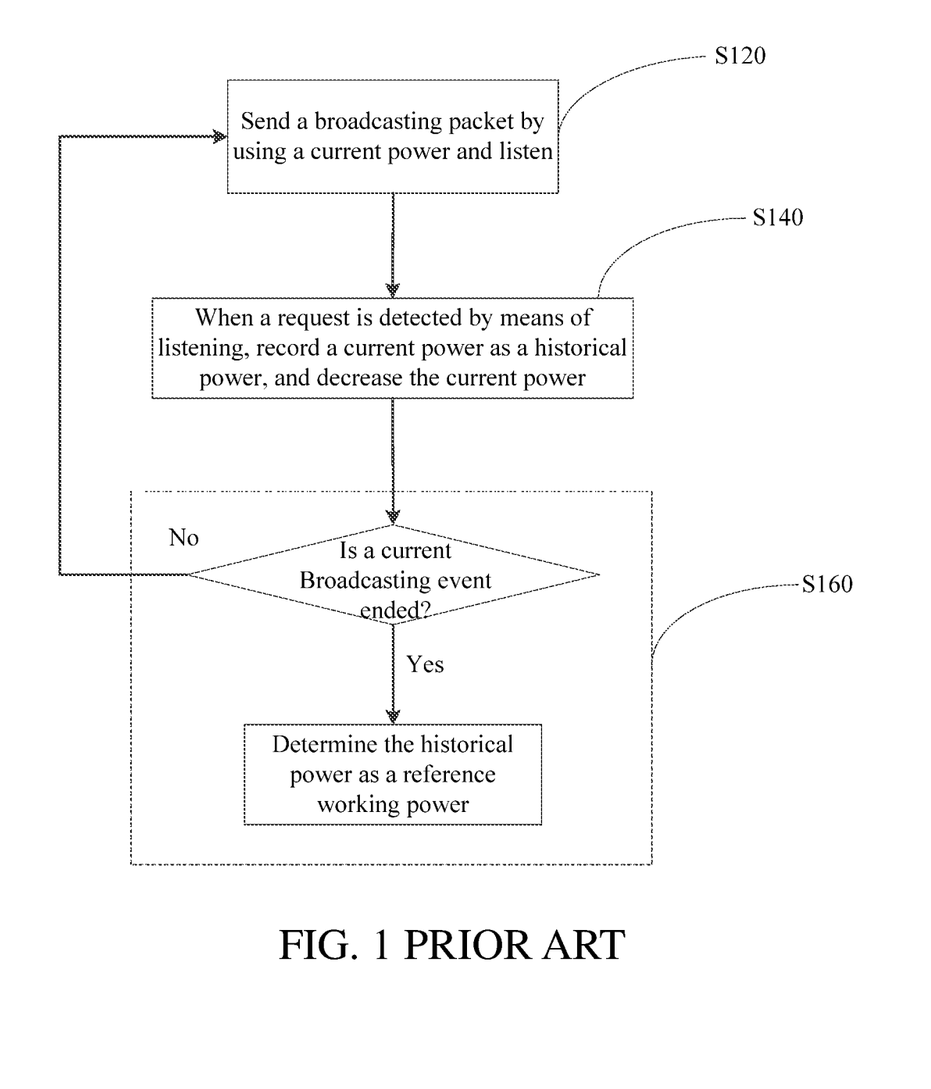
FIG. 1 is a flowchart of a broadcasting method for wireless communication according to an embodiment of the present application.

Using a Bluetooth Low Energy (BLE) profile as an example, a wireless device discovery process involves different device roles and operation procedures thereof, which comprise:

1) A slave device role, which serves as an advertiser to execute a broadcasting process. In this period, a slave device keeps entering broadcasting events, as shown in FIG. 1. An interval period $T_a$ exists between start times of neighboring broadcasting events, and the interval period consists of a broadcasting interval (advInterval) having a fixed length and a broadcasting delay (advDelay) of which the length is generated randomly. In a broadcasting event, the adviser separately sends packet data units (PDUs), namely, broadcasting packets, on broadcasting channels 37, 38, and 39.

Figure 2:
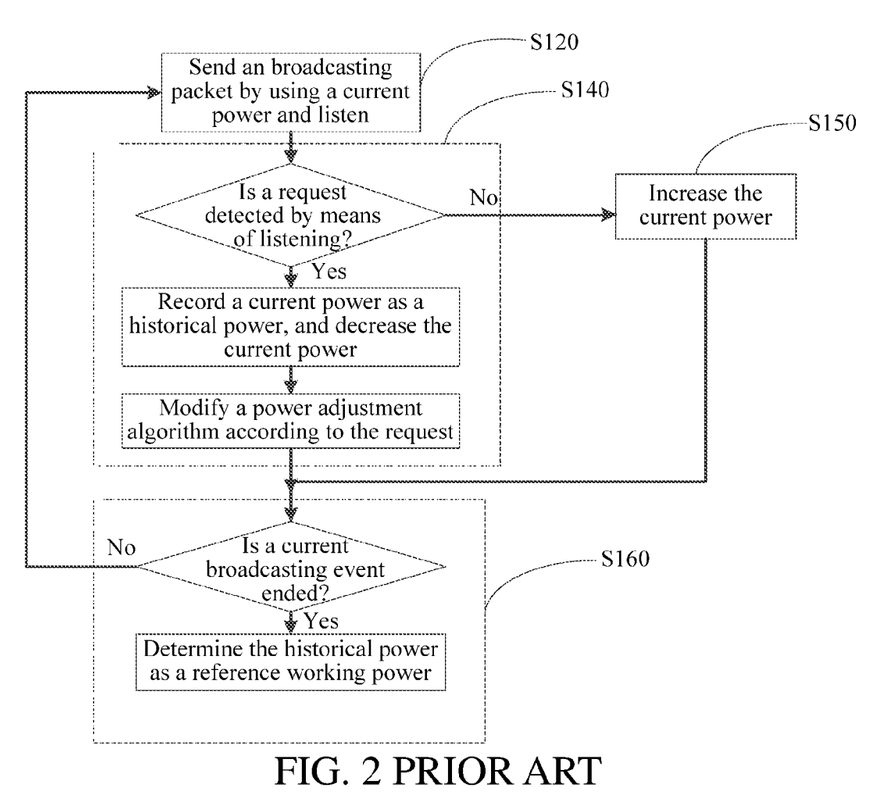
FIG. 2 is a flowchart of a broadcasting method for wireless communication according to another embodiment of the present application.

2) A master device role, which serves as an initiator/scanner to execute an initiating/scan process. As shown in FIG. 2, the initiating/scan process comprises a scan interval (scanInterval) that appears repeatedly, where each interval comprises a scan window (scanWindow). In different scan windows, a radio frequency module of the master device listens on the broadcasting channels 37, 38, and 39, and receives a broadcasting PDU on a corresponding channel; outside the scan window, the master device performs regular scheduling, or turns off the radio frequency module. If the initiator/scanner receives a broadcasting PDU, it means that the master device successfully discovers a corresponding advertiser device. An initiator may directly send a connection request (CONN_REQ) to agree with an advertiser on information such as a time point for initial sending and receiving, an interval between different sending and receiving operations, and a frequency hopping channel and frequency hopping mode used, thereby establishing a connection. A scanner may send a scan request (SCAN_REQ), to require the advertiser to reply so as to provide more related information.

It can be seen that, a discovery process between wireless devices is a mutual probing process, which does not involve determining of a transmit power, and this is not favorable to reducing power consumption of communication between wireless devices.

SUMMARY

An example, non-limiting objective of one or more embodiments of the present application is to provide a broadcasting method and device for wireless communication, and a scan method and device for wireless communication, so as to reduce power consumption of communication between wireless devices.

According to an aspect of one or more embodiments of the present application, a broadcasting method for wireless communication is provided, and the method comprises:

a broadcasting and listening step: sending a broadcasting packet by using a current power and listening;

a power decreasing step: when a request is detected by means of listening, recording the current power as a historical power, and decreasing the current power; and a power determining step: determining whether a current broadcasting event is ended, if the current broadcasting event is ended, determining the historical power as a reference working power, and otherwise, returning to the broadcasting and listening step.

According to another aspect of one or more embodiments of the present application, a scan method for wireless communication is provided, and the method comprises:

a scan and listening step: performing scan and listening;

an adjustment step: when a broadcasting packet is detected by means of listening, if a request has been sent to a sender of the broadcasting packet and a received signal strength of the broadcasting packet changes, adjusting a first transmit power; and a request sending step: sending the request to the sender of the broadcasting packet according to the adjusted first transmit power.

According to another aspect of one or more embodiments of the present application, a scan method for wireless communication is provided, and the method comprises:

a scan and listening step: performing scan and listening;

an adjustment step: when a broadcasting packet is detected by means of listening, if a request has been sent to a sender of the broadcasting packet and information about a second transmit power and comprised in the broadcasting packet changes, adjusting a first transmit power; and a request sending step: sending the request to the sender of the broadcasting packet according to the adjusted first transmit power.

According to another aspect of one or more embodiments of the present application, a broadcasting device for wireless communication is provided, and the broadcasting device comprises:

a broadcasting and listening module, configured to send a broadcasting packet by using a current power and listen;

a power decreasing module, configured to: when the broadcasting and listening module detects a request by means of listening, record the current power as a historical power, and decrease the current power; and a power determining module, configured to determine whether a current broadcasting event is ended, and if the current broadcasting event is ended, determine the historical power as a reference working power.

According to another aspect of one or more embodiments of the present application, a scan device for wireless communication is provided, and the scan device comprises:

a scan and listening module, configured to perform scan and listen;

an adjustment module, configured to: when the scan and listening module detects a broadcasting packet by means of listening, if a request has been sent to a sender of the broadcasting packet and a received signal strength of the broadcasting packet changes, adjust a first transmit power; and a request sending module, configured to send the request to the sender of the broadcasting packet according to the adjusted first transmit power.

According to another aspect of one or more embodiments of the present application, a scan device for wireless communication is provided, and the scan device comprises:

a scan and listening module, configured to perform scan and listen;

an adjustment module, configured to: when the scan and listening module detects a broadcasting packet by means of listening, if a request has been sent to a sender of the broadcasting packet and information about a second transmit power comprised in the broadcasting packet changes, adjust a first transmit power; and a request sending module, configured to send the request to the sender of the broadcasting packet according to the adjusted first transmit power.

According to another aspect of one or more embodiments of the present application, a computer readable storage device is provided, and the computer readable storage device comprises at least one executable instruction, which, in response to execution, causes a broadcasting device for wireless communications comprising a processor to perform operations, comprising:

a broadcasting and listening step: sending a broadcasting packet by using a current power and listening;

a power decreasing step: when a request is detected by means of listening, recording the current power as a historical power, and decreasing the current power; and a power determining step: determining whether a current broadcasting event is ended, if the current broadcasting event is ended, determining the historical power as a reference working power, and otherwise, returning to the broadcasting and listening step.

According to another aspect of one or more embodiments of the present application, a broadcasting device for wireless communications is provided, the broadcasting device for wireless communications characterized by comprising a processor and a memory, the memory storing computer executable instructions, the processor being connected to the memory through a communication bus, and when the broadcasting device for wireless communications operates, the processor executing the computer executable instructions stored in the memory, so that the broadcasting device for wireless communications executes operations, comprising:

a broadcasting and listening step: sending a broadcasting packet by using a current power and listening;

a power decreasing step: when a request is detected by means of listening, recording the current power as a historical power, and decreasing the current power; and a power determining step: determining whether a current broadcasting event is ended, if the current broadcasting event is ended, determining the historical power as a reference working power, and otherwise, returning to the broadcasting and listening step.

According to another aspect of one or more embodiments of the present application, a computer readable storage device is provided, the computer readable storage device comprises at least one executable instruction, which, in response to execution, causes a scan device for wireless communications comprising a processor to perform operations, comprising:

a scan and listening step: performing scan and listening;

an adjustment step: when a broadcasting packet is detected by means of listening, if a request has been sent to a sender of the broadcasting packet and a received signal strength of the broadcasting packet changes, adjusting a first transmit power; and a request sending step: sending the request to the sender of the broadcasting packet according to the adjusted first transmit power.

According to another aspect of one or more embodiments of the present application, a scan device for wireless communications is provided, the scan device for wireless communications characterized by comprising a processor and a memory, the memory storing computer executable instructions, the processor being connected to the memory through a communication bus, and when the scan device for wireless communications operates, the processor executing the computer executable instructions stored in the memory, so that the scan device for wireless communications executes operations, comprising:

a scan and listening step: performing scan and listening;

an adjustment step: when a broadcasting packet is detected by means of listening, if a request has been sent to a sender of the broadcasting packet and a received signal strength of the broadcasting packet changes, adjusting a first transmit power; and a request sending step: sending the request to the sender of the broadcasting packet according to the adjusted first transmit power.

According to another aspect of one or more embodiments of the present application, a computer readable storage device is provided, the computer readable storage device comprises at least one executable instruction, which, in response to execution, causes a scan device for wireless communications comprising a processor to perform operations, comprising:

a scan and listening step: performing scan and listening;

an adjustment step: when a broadcasting packet is detected by means of listening, if a request has been sent to a sender of the broadcasting packet and information about a second transmit power comprised in the broadcasting packet changes, adjusting a first transmit power; and a request sending step: sending the request to the sender of the broadcasting packet according to the adjusted first transmit power.

According to another aspect of one or more embodiments of the present application, a scan device for wireless communications is provided, the scan device for wireless communications characterized by comprising a processor and a memory, the memory storing computer executable instructions, the processor being connected to the memory through a communication bus, and when the scan device for wireless communications operates, the processor executing the computer executable instructions stored in the memory, so that the scan device for wireless communications executes operations, comprising:

a scan and listening step: performing scan and listening;

an adjustment step: when a broadcasting packet is detected by means of listening, if a request has been sent to a sender of the broadcasting packet and information about a second transmit power comprised in the broadcasting packet changes, adjusting a first transmit power; and a request sending step: sending the request to the sender of the broadcasting packet according to the adjusted first transmit power In a broadcasting method and a broadcasting device of one or more embodiments of the present application, after a request is detected by means of listening, a broadcasting event is not ended immediately; instead, broadcasting and listening are continued after a power value is decreased, until the current broadcasting event is ended, so that a finally determined reference working power is closer to a minimum power of the broadcasting device while ensuring communication, where the reference working power may be used as a working power of a communication connection, or may be used as a basis for selecting a connection object by a device, which is beneficial to reducing communication power consumption.

In a scan method and a scan device of one or more embodiments of the present application, when a broadcasting packet is received, a communication connection is not established immediately or more information is not acquired from a sender of the broadcasting packet immediately; instead, it is determined whether a first transmit power used for sending the request needs to be adjusted, and if the first transmit power needs to be adjusted, the request is sent to the sender of the broadcasting packet after the first transmit power is adjusted. By adjusting the first transmit power, the first transmit power is closer to a minimum power of the scan device while ensuring communication, and the finally obtained first transmit power can be used as a reference working power. A scan method provides a data support for reducing communication power consumption, and is beneficial to reducing communication power consumption.

DETAILED DESCRIPTION

The following describes specific example embodiments of the present application in further detail with reference to the accompanying drawings and embodiments. The following embodiments are used to describe the present application, but are not intended to limit the scope of the present application.

Persons skilled in the art may understand that, technical terms such as "first" and "second" in the present application are merely used to distinguish different steps, devices, modules, or the like, and the technical terms neither represent any specific technical meaning nor indicate any certain logical sequence.

In addition, in one or more of the embodiments of the present application, sequence numbers of the following steps do not indicate an execution sequence of steps; the execution sequence of the steps depends on functions and internal logic of the steps, and should not constitute any limitation on the implementation process of the embodiments of the present application.

In many application scenarios, one device may discover another device by using a high transmit power, and establish a wireless communication connection, so as to transmit data. In order to reduce communication power consumption, after the wireless communication connection is established, the device may decrease the transmit power thereof to an appropriate value, where the appropriate value is generally between a maximum power and a minimum power of the device, and it is favorable that the appropriate value can just ensure effective communication. By means of such power adjustment, communication power consumption can be reduced to a certain extent. However, before the power is adjusted, the problem of high power consumption still exists. If a power value that just can be used for effective communication of the device is determined before establishment of a communication connection, for example, during a device discovery process, and the determined power value is used as a reference working power for communication of the device after the connection is established, the communication power consumption can be further reduced.

Therefore, an embodiment of the present application provides a broadcasting method for wireless communication. As shown in FIG. 1, the method comprises the following steps:

S120: A broadcasting and listening step: send a broadcasting packet by using a current power and listen.

S140: A power decreasing step: when a request is detected by means of listening, record the current power as a historical power, and decrease the current power.

S160: A power determining step: determine whether a current broadcasting event is ended, if the current broadcasting event is ended, determine the historical power as a reference working power, and otherwise, return to the broadcasting and listening step.

In a broadcasting method according to an embodiment of the present application, first, a broadcasting packet is sent by using a high power; after a request is detected by means of listening, a broadcasting event is not ended immediately; instead, broadcasting and listening are continued after a power value is decreased, until the current broadcasting event is ended, so that a finally determined reference working power is closer to a minimum power of a sender of the broadcasting packet while ensuring communication, where the reference working power may be used as a working power of a communication connection, or may be used as a basis for selecting a connection object by a device, which is beneficial to reducing communication power consumption.

Specifically, in Step S140, the request may be a connection request sent by an initiator, or a scan request sent by a scanner.

The decreasing the current power may be decreasing the current power according to a power adjustment algorithm, where the power adjustment algorithm may be, for example, at least one of a dynamic programming algorithm, a prediction algorithm, and a search algorithm. For example, a simple search algorithm is that, a fixed step value is subtracted from the current power each time.

Optionally, the broadcasting packet may comprise the power adjustment algorithm, so that a receiver of the broadcasting packet may cooperate with a sender of the broadcasting packet when the sender sends the request (a connection request or scan request), for example, delaying sending of the request.

In Step S160, each broadcasting event generally comprises predetermined times of broadcasting packet sending, and after the predetermined times of broadcasting packet sending are completed, whether the request is received or not, the broadcasting event is ended. By using BLE communication as an example, each broadcasting event thereof generally comprises three times of broadcasting packet sending, and therefore, in the method, the value of the current power can be adjusted twice at most, and a reference working power obtained after the adjustment can be close to the minimum power. It is understood by persons skilled in the art that, if each broadcasting event can comprise more times of broadcasting packet sending, the reference working power can be closer to the minimum power, thereby making it easier to reduce communication power consumption.

In addition, to ensure that the reference working power can be obtained in Step S160, an initial value of the current power should be large enough, so that the request can be detected by means of listening after first broadcasting.

In an example embodiment of a method of the present application, to ensure that a sender of the request can determine, according to the received broadcasting packet, a power for sending the request, the broadcasting packet optionally comprises the current power. According to the current power, and a signal strength when the broadcasting packet is received, the sender of the request can calculate a corresponding path loss. Based on the path loss, the sender of the request can determine a transmit power ensuring that the request is just received correctly, and then sends the request by using the transmit power, thereby further reducing the communication power consumption.

Referring to FIG. 2, in an example embodiment of the present application, Step S140 further comprises: modifying the power adjustment algorithm according to the request. For example, when the sender of the broadcasting packet supports multiple power adjustment algorithms, while the sender of the request only supports one of the power adjustment algorithms, the sender of the request may describe, in the request, the power adjustment algorithm supported by the sender of the request, and after receiving the request, the sender of the broadcasting packet may modify the power adjustment algorithms to be the power adjustment algorithm supported by the sender of the request. By means of the foregoing modification, the sender of the broadcasting packet and the sender of the request may cooperate with each other, facilitating quick acquisition of a reference working power close to the minimum power.

In addition, as shown in FIG. 2, the method further comprises the following step:

S150: A power increasing step: when no request is detected by means of listening, increase the current power. Generally, the method is started with a high current power, and then, the current power is decreased gradually according to Step S140; that no request is detected by means of listening may be caused by an excessively low current power. For example, assuming that a broadcasting packet sent by a broadcasting device by using minimum 3 dB can be just detected by another scan device by means of listening, when the broadcasting device sends the broadcasting packet by using 8 dB in the first time, the broadcasting device can receive a request; when the broadcasting device sends the broadcasting packet by using 4 dB in the second time, the broadcasting device can still receive a request; when the broadcasting device sends the broadcasting packet by using 2 dB in the third time, the broadcasting device cannot receive a request due to an excessively low power. In this case, by increasing the current power appropriately, the probability of detecting a request by means of listening by the broadcasting device can be increased. Optionally, the current power may be increased according to the power adjustment algorithm.

In addition, if a request is detected by means of listening before the power is decreased, while no request is detected by means of listening after the power is decreased, it indicates that by using the power which is before being decreased, namely, the historical power, the request can be detected by means of listening. Therefore, to obtain a reference working power close to the minimum power, the increased current power is less than or equal to the historical power. Still using the foregoing assumption, when increasing the current power, the broadcasting device may try to increase the current power to 2.5 dB or 3 dB, but it is unnecessary to increase the current power to 4.5 dB, because it has been proved that at 4 dB, a request can be received.

In conclusion, in a broadcasting method according to an embodiment of the present application, after a request is detected by means of listening, broadcasting and listening may be continued after a power is gradually decreased according to a power adjustment algorithm, and when no request can be obtained by means of listening, broadcasting and listening may be continued after the power is increased according to the power adjustment algorithm. In addition, the power adjustment algorithm may be modified according to the received request, and by performing a series of adjustment on a transmit power of the broadcasting packet, a finally determined reference working power is close to a minimum power of a sender of the broadcasting packet while ensuring communication, which provides a data support for reducing communication power consumption, and is beneficial to reducing communication power consumption in the field of communications, such as Bluetooth and ZigBee.

In addition, an embodiment of the present application further provides a computer-readable medium, comprising a computer readable instruction when the following operations are executed: executing operations of steps S120, S140 and S160 of the method in the embodiment shown in the above FIG. 1.

Figure 3:
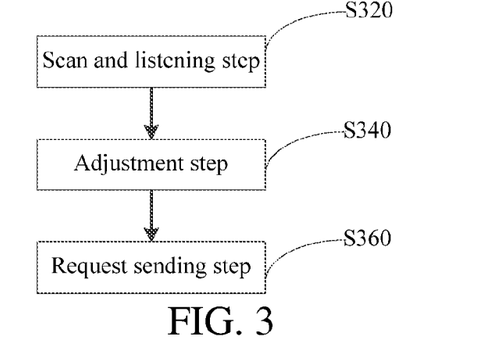
FIG. 3 is a flowchart of a scan method for wireless communication according to an embodiment of the present application.

Referring to FIG. 3, an embodiment of the present application further provides a scan method for wireless communication, and the scan method comprises the following steps:

S320: A scan and listening step: perform scan and listen.

S340: An adjustment step: when a broadcasting packet is detected by means of listening, if a request has been sent to a sender of the broadcasting packet and a received signal strength of the broadcasting packet changes, adjust a first transmit power.

S360: A request sending step: send the request to the sender of the broadcasting packet according to the adjusted first transmit power.

In a scan method according to an embodiment of the present application, when receiving a broadcasting packet, a request sender does not establish a communication connection immediately or acquire more information from a sender of the broadcasting packet immediately; instead, the request sender determines whether a first transmit power used for sending a request needs to be adjusted; and if a request has been sent to the sender of the broadcasting packet and a received signal strength of the broadcasting packet changes, after adjusts the first transmit power, and then sends the request to the sender of the broadcasting packet. By adjusting the first transmit power, the first transmit power is closer to a minimum power of the request sender, and the finally obtained first transmit power can be used as a reference working power. The scan method provides a data support for reducing communication power consumption, which is beneficial to reducing communication power consumption.

According to the prior art, when the sender of the broadcasting packet does not receive any request, and broadcasting times do not cause a broadcasting event to end, the sender of the broadcasting packet continues to send the broadcasting packet; after the sender of the broadcasting packet receives a request, the broadcasting event is ended. To implement the method of the present application, it may be set that, for a common broadcasting packet sender, when it does not receive any request and broadcasting times do not cause a broadcasting event to end, the common broadcasting packet sender continues to send the broadcasting packet by using an unchanged power; and for a broadcasting packet sender capable of adjusting a power, as described in the present application, when it does not receive any request and broadcasting times do not cause a broadcasting event to end, the broadcasting packet sender of the present application continues to send the broadcasting packet after increasing the power, and when it receives a request and broadcasting times do not cause the broadcasting event to end, the broadcasting packet sender of the present application continues to send the broadcasting packet after decreasing the power.

Therefore, when the request sender receives the broadcasting packet from the sender of the broadcasting packet again after sending the request to the sender of the broadcasting packet (that is, the broadcasting packet from the same broadcasting packet sender is received at least twice), and the transmit power of the broadcasting packet changes, it indicates that the sender of the broadcasting packet receives the request, and is adjusting the transmit power.

When the position of the sender of the broadcasting packet is relatively fixed, for example, the sender of the broadcasting packet is a server or a desktop computer, in this case, if a received signal strength of the broadcasting packet changes, it can be considered that the sender of the broadcasting packet actively adjusts the transmit power. This indicates that the sender of the broadcasting packet expects to obtain, by adjusting the transmit power, a reference working power that can ensure communication and is close to a minimum power of the sender of the broadcasting packet. In this case, the request sender may also adjust the first transmit power, so that the first transmit power is closer to a minimum power of the request sender.

During adjustment on the first transmit power, the first transmit power may be adjusted according to a change trend of a second transmit power. For example, when the second transmit power decreases, the first transmit power is decreased, and when the second transmit power increases, the first transmit power is increased. When the second transmit power decreases, it indicates that the sender of the broadcasting packet receives the request previously sent by the request sender, and therefore, the request sender may try a lower transmit power; when the second transmit power increases, it indicates that the sender of the broadcasting packet does not receive the request previously sent by the request sender, and therefore, the request sender should try a higher transmit power.

In addition, optionally, the broadcasting packet may comprise a power adjustment algorithm; when the first transmit power needs to be adjusted, the first transmit power may be adjusted according to the power adjustment algorithm. The power adjustment algorithm may be an adjustment algorithm used by the sender of the broadcasting packet to adjust the transmit power of itself, and the request sender may make reference to the power adjustment algorithm for the broadcasting packet, to adjust the first transmit power.

Figure 4:
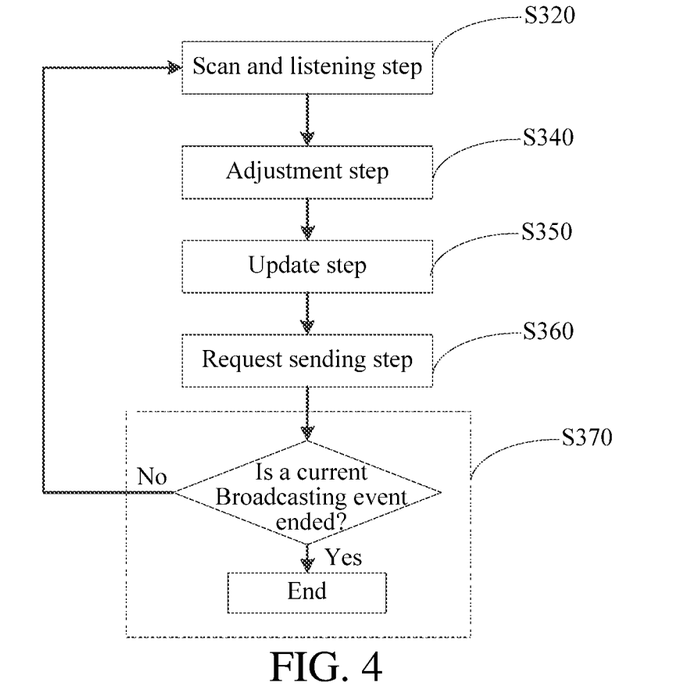
FIG. 4 is a flowchart of a scan method for wireless communication according to another embodiment of the present application.

Referring to FIG. 4, in another embodiment of the present application, before Step S360, the method further comprises:

S350: An update step: when the first transmit power needs to be adjusted, update related information comprised in the request.

Correspondingly, in Step S360, the request comprising the updated related information is sent to the sender of the broadcasting packet according to the adjusted first transmit power.

When the request sender sends the request to the sender of the broadcasting packet for multiple times, if information about a connection establishment time and comprised in the request is not updated, in the case where a connection needs to be established, the request sender and the sender of the broadcasting packet may need multiple connection attempts before successfully establishing a connection. Therefore, the related information herein may comprise the information about a connection establishment time.

After Step S360, the method further comprises the following step:

S370: A window determining step: determine whether a current scan window is ended, and if the current scan window is not ended, return to the scan and listening step.

In Step S370, each scan window may comprise unfixed times of scanning. Using BLE communication as an example, a Bluetooth device executing scan may be constantly in a scan window when there is no other task except a scan task; when another task is assigned to the Bluetooth device according to scheduling, the Bluetooth device ends the scan window. It can be understood by persons skilled in the art that, if more times of scan can be executed in each scan window, the first transmit power may have more chances to be adjusted, and therefore, the first transmit power can be closer to the minimum power, making it easier to reduce communication power consumption.

In conclusion, in a scan method according to an embodiment of the present application, when receiving a broadcasting packet, a request sender may determine, according to a request sending history and a received signal strength of the broadcasting packet, whether a first transmit power for sending a request needs to be adjusted, and if the first transmit power needs to be adjusted, adjusts the first transmit power, then sends the request to a sender of the broadcasting packet, and repeats the foregoing process before a current scan window is ended. By adjusting the first transmit power, the first transmit power is close to a minimum power of the request sender while ensuring communication, and the finally obtained first transmit power can be used as a reference working power. The scan method provides a data support for reducing communication power consumption, and is beneficial to reducing communication power consumption in fields of communications such as Bluetooth and ZigBee.

In addition, an embodiment of the present application further provides a computer-readable medium, comprising a computer readable instruction when the following operations are executed: executing operations of steps S320, S340 and S360 of the method in the embodiment shown in the above FIG. 3.

An embodiment of the present application provides another scan method for wireless communication, and the scan method comprises the following steps:

S420: A scan and listening step: perform scan and listen.

S440: An adjustment step: when a broadcasting packet is detected by means of listening, if a request has been sent to a sender of the broadcasting packet and information about a second transmit power comprised in the broadcasting packet changes, adjust a first transmit power.

S460: A request sending step: send the request to the sender of the broadcasting packet according to the adjusted first transmit power.

In a scan method according to an embodiment of the present application, when receiving a broadcasting packet, a request sender does not establish a communication connection immediately or acquire more information from a sender of the broadcasting packet immediately; instead, the request sender determines whether a first transmit power used for sending a request needs to be adjusted; and if a request has been sent to the sender of the broadcasting packet and information about a second transmit power and comprised in the broadcasting packet changes, adjusts the first transmit power and then sends the request to the sender of the broadcasting packet. By adjusting the first transmit power, the first transmit power is closer to a minimum power of the request sender while ensuring communication, and the finally obtained first transmit power can be used as a reference working power. The scan method provides a data support for reducing communication power consumption, and is beneficial to reducing communication power consumption.

Similar to the foregoing embodiment, to implement the method of the present application, it may be set that, for a common broadcasting packet sender, when it does not receive any request and broadcasting times do not cause a broadcasting event to end, the common broadcasting packet sender continues to send the broadcasting packet by using an unchanged power; and for a broadcasting packet sender capable of adjusting a power, as described in the present application, when it does not receive any request and broadcasting times do not cause a broadcasting event to end, the broadcasting packet sender of the present application continues to send the broadcasting packet after increasing the power, and when it receives a request and broadcasting times do not cause the broadcasting event to end, the broadcasting packet sender of the present application continues to send the broadcasting packet after decreasing the power.

Therefore, when the request sender receives the broadcasting packet from the sender of the broadcasting packet again after sending the request to the sender of the broadcasting packet (that is, the broadcasting packet from the same broadcasting packet sender is received at least twice), and the transmit power of the broadcasting packet changes, it indicates that the sender of the broadcasting packet receives the request, and is adjusting the transmit power.

In this embodiment, the broadcasting packet comprises information about a second transmit power, that is, comprises information about a transmit power of the broadcasting packet; after receiving the broadcasting packet, the request sender reads the information about the second transmit power in the broadcasting packet, and if the information about the second transmit power changes, it indicates that the sender of the broadcasting packet expects to obtain, by adjusting the transmit power, a reference working power close to a minimum power of the sender of the broadcasting packet. In this case, the request sender may also adjust the first transmit power, so that the first transmit power is closer to the minimum power of the request sender.

Similar to the foregoing embodiment, during adjustment on the first transmit power, the first transmit power may be adjusted according to a change trend of the second transmit power. For example, when the second transmit power decreases, the first transmit power is decreased, and when the second transmit power increases, the first transmit power is increased. When the second transmit power decreases, it indicates that the sender of the broadcasting packet receives the request previously sent by the request sender, and therefore, the request sender may try a lower transmit power; when the second transmit power increases, it indicates that the sender of the broadcasting packet does not receive the request previously sent by the request sender, and therefore, the request sender should try a higher transmit power.

In addition, optionally, the broadcasting packet may comprise a power adjustment algorithm; when the first transmit power needs to be adjusted, the first transmit power may be adjusted according to the power adjustment algorithm. The power adjustment algorithm may be an adjustment algorithm used by the sender of the broadcasting packet to adjust the transmit power of itself, and the request sender may make reference to the power adjustment algorithm of the broadcasting packet, to adjust the first transmit power.

Before Step S460, the method further comprises the following step:

S450: An update step: when the first transmit power needs to be adjusted, update related information comprised in the request.

Correspondingly, in Step S460, the request comprising the updated related information is sent to the sender of the broadcasting packet according to the adjusted first transmit power.

When the request sender sends the request to the sender of the broadcasting packet for multiple times, if information about a connection establishment time and comprised in the request is not updated, in the case where a connection needs to be established, the request sender and the sender of the broadcasting packet may need multiple connection attempts before successfully establishing a connection. Therefore, the related information herein may comprise the information about a connection establishment time.

After Step S460, the method may further comprise:

S470: A window determining step: determine whether a current scan window is ended, and if the current scan window is ended, return to the scan and listening step.

In Step S470, each scan window may comprise unfixed times of scanning. Using BLE communication as an example, a Bluetooth device executing scan may be constantly in a scan window when there is no other task except a scan task; when another task is assigned to the Bluetooth device according to scheduling, the Bluetooth device ends the scan window. It can be understood by persons skilled in the art that, if more times of scan can be executed in each scan window, the first transmit power may have more chances to be adjusted, and therefore, the first transmit power can be closer to the minimum power, making it easier to reduce communication power consumption.

In conclusion, in a scan method according to an embodiment of the present application, when receiving a broadcasting packet, a request sender may determine, according to a request sending history and information about a second transmit power and comprised in the broadcasting packet, whether a first transmit power for sending a request needs to be adjusted, and if the first transmit power needs to be adjusted, adjusts the first transmit power, then sends the request to a sender of the broadcasting packet, and repeats the foregoing process before a current scan window is ended. By adjusting the first transmit power, the first transmit power is close to a minimum power of the request sender while ensuring communication, and the finally obtained first transmit power can be used as a reference working power. The scan method provides a data support for reducing communication power consumption, and is beneficial to reducing communication power consumption in fields of communications, such as Bluetooth and ZigBee.

In addition, an embodiment of the present application further provides a computer-readable medium, comprising a computer readable instruction when the following operations are executed: executing operations of steps S420, S440 and S460 of the method in the embodiment above.

Figure 5:
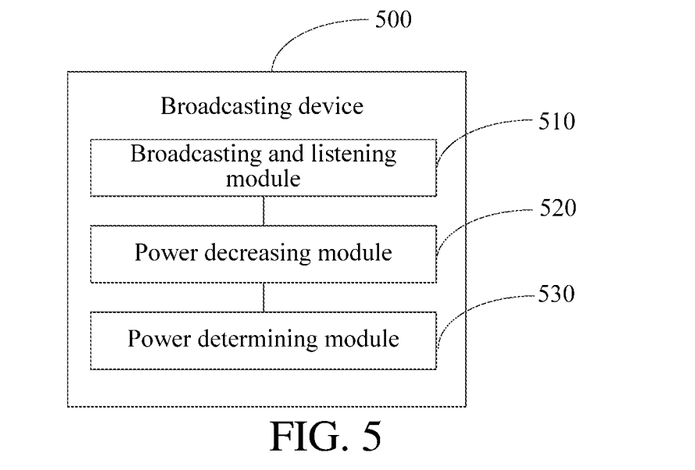
FIG. 5 is a schematic structural diagram of modules of a broadcasting device according to an embodiment of the present application.

FIG. 5 is a schematic structural diagram of modules of a broadcasting device for wireless communication according to an embodiment of the present application. The broadcasting device 500 may be a Bluetooth device, a ZigBee device, or the like, for example, the broadcasting device 500 may be a Bluetooth headset, a smart phone, or a smart glass.

As shown in FIG. 5, the broadcasting device 500 may comprise: a broadcasting and listening module 510, a power decreasing module 520, and a power determining module 530.

The broadcasting and listening module 510 is configured to send a broadcasting packet by using a current power and listen.

The power decreasing module 520 is configured to: when the broadcasting and listening module 510 detects a request by means of listening, record the current power as a historical power, and decrease the current power.

The power determining module 530 is configured to determine whether a current broadcasting event is ended, and if the current broadcasting event is ended, determine the historical power as a reference working power.

Specifically, the request may be a connection request sent by an initiator, or a scan request sent by a scanner.

The decreasing the current power may be decreasing the current power according to a power adjustment algorithm, where the power adjustment algorithm may be, for example, at least one of a dynamic programming algorithm, a prediction algorithm, and a search algorithm. For example, a simple search algorithm is that, a fixed step value is subtracted from the current power each time.

Optionally, the broadcasting packet may comprise the power adjustment algorithm, so that a receiver of the broadcasting packet may cooperate with a sender of the broadcasting packet when the sender sends the request (a connection request or scan request), for example, delaying sending of the request.

Each broadcasting event generally comprises predetermined times of broadcasting packet sending, and after the predetermined times of broadcasting packet sending are completed, whether the request is received or not, the broadcasting event is ended. By using BLE communication as an example, each broadcasting event thereof generally comprises three times of broadcasting packet sending, and therefore, in the method, the value of the current power can be adjusted twice at most, and a reference working power obtained after the adjustment can be close to the minimum power. It is understood by persons skilled in the art that, if each broadcasting event can comprise more times of broadcasting packet sending, the reference working power can be closer to the minimum power, thereby making it easier to reduce communication power consumption.

Figure 6:
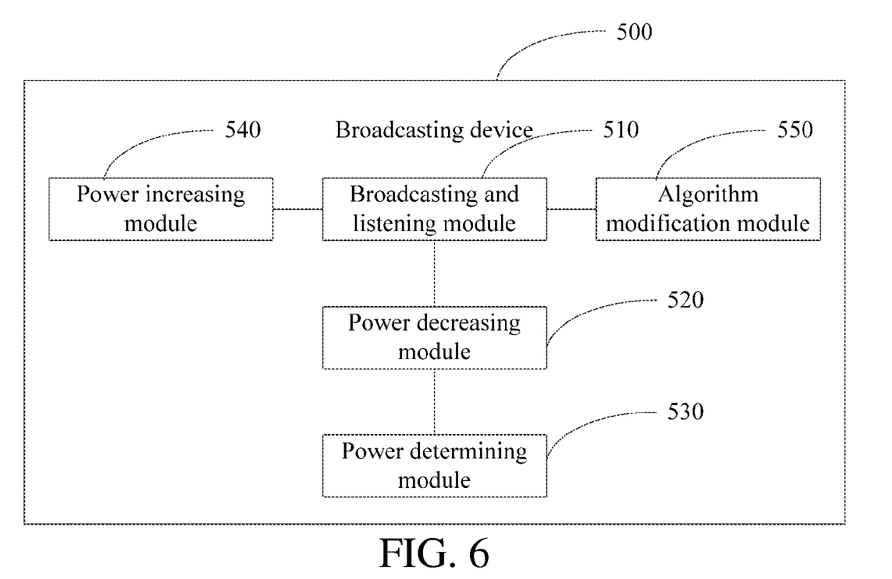
FIG. 6 is a schematic structural diagram of modules of a broadcasting device according to another embodiment of the present application.

Referring to FIG. 6, in another embodiment of the present application, the broadcasting device 500 may further comprise: a power increasing module 540 and an algorithm modification module 550.

The power increasing module 540 is configured to: when the broadcasting and listening module does not detect any request by means of listening, increase the current power. Generally, that no request is detected by means of listening may be caused by an excessively low current power. In this case, by increasing the current power appropriately, the probability of detecting a request by means of listening can be increased. Optionally, the current power may be increased according to the power adjustment algorithm.

In addition, if a request is detected by means of listening before the power is decreased, while no request is detected by means of listening after the power is decreased, it indicates that by using the power which is before being decreased, namely, the historical power, the request can be detected by means of listening. Therefore, to obtain a reference working power close to the minimum power, the increased current power is less than or equal to the historical power.

The algorithm modification module 550 is configured to: when the broadcasting and listening module detects the request by means of listening, modify the power adjustment algorithm according to the request. For example, when the broadcasting device supports multiple power adjustment algorithms, while a sender of the request only supports one of the power adjustment algorithms, the sender of the request may describe, in the request, the power adjustment algorithm supported by the sender of the request, and after receiving the request, the broadcasting device may modify the power adjustment algorithms to be the power adjustment algorithm supported by the sender of the request. By means of the foregoing modification, the broadcasting device and the request sender may cooperate with each other, which facilitates quick acquisition of a reference working power close to the minimum power.

Figure 7A:
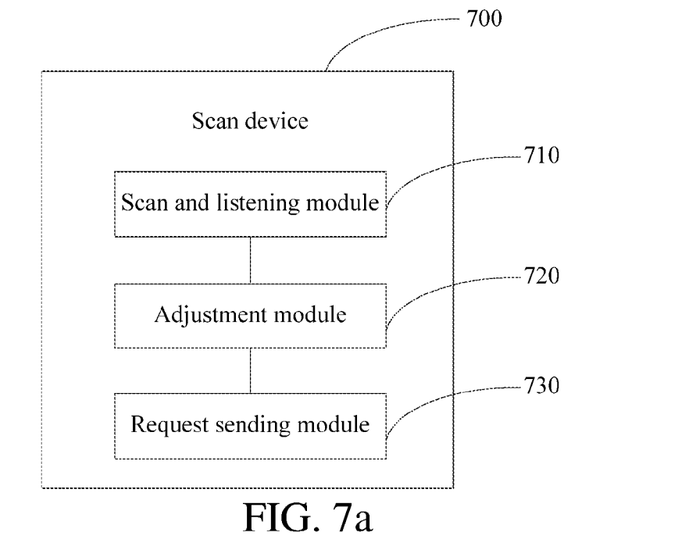
FIG. 7a is a schematic structural diagram of modules of an example scan device according to an embodiment of the present application.

FIG. 7a is a schematic structural diagram of modules of a scan device for wireless communication according to an embodiment of the present application. The scan device 700 may be a Bluetooth device, a ZigBee device, or the like, for example, the scan device 700 may be a Bluetooth headset, a smart phone, or a smart glass.

As shown in FIG. 7*a*, the scan device 700 may comprise: a scan and listening module 710, an adjustment module 720, and a request sending module 730.

The scan and listening module 710 is configured to perform scan and listen.

The adjustment module 720 is configured to: when the scan and listening module 710 detects a broadcasting packet by means of listening, if a request has been sent to a sender of the broadcasting packet and a received signal strength of the broadcasting packet changes, adjust a first transmit power.

The request sending module 730 is configured to send the request to the sender of the broadcasting packet according to the adjusted first transmit power.

Specifically, in this embodiment, the request may be a connection request or a scan request.

According to the prior art, when the broadcasting device does not receive any request, and broadcasting times do not cause a broadcasting event to end, the broadcasting device continues to send the broadcasting packet; after the broadcasting device receives a request, the broadcasting event is ended. To implement the method of the present application, it may be set that, for a common broadcasting device, when it does not receive any request and broadcasting times do not cause a broadcasting event to end, the broadcasting device continues to send the broadcasting packet by using an unchanged power; and for an broadcasting device capable of adjusting a power, as described in the present application, when it does not receive any request and broadcasting times do not cause a broadcasting event to end, the broadcasting device of the present application continues to send the broadcasting packet after increasing the power, and when it receives a request and broadcasting times do not cause the broadcasting event to end, the broadcasting device of the present application continues to send the broadcasting packet after decreasing the power.

Therefore, when the scan device receives the broadcasting packet from the broadcasting device again after sending the request to the broadcasting device (that is, the broadcasting packet from the same broadcasting device is received at least twice), and the transmit power of the broadcasting packet changes, it indicates that the broadcasting device receives the request, and is adjusting the transmit power.

When the position of the broadcasting device is relatively fixed, for example, the broadcasting device is a server or a desktop computer, in this case, if a received signal strength of the broadcasting packet changes, it can be considered that the broadcasting device actively adjusts the transmit power. This indicates that the broadcasting device expects to obtain, by adjusting the transmit power, a reference working power that can ensure communication and is close to a minimum power of the broadcasting device. In this case, the scan device may also adjust the first transmit power, so that the first transmit power is closer to a minimum power of the scan device.

When the first transmit power needs to be adjusted, the adjustment module 720 may adjust the first transmit power according to a change trend of a second transmit power. For example, when the second transmit power decreases, the first transmit power is decreased, and when the second transmit power increases, the first transmit power is increased. When the second transmit power decreases, it indicates that the broadcasting device receives the request previously sent by the scan device, and therefore, the scan device may try a lower transmit power; when the second transmit power increases, it indicates that the broadcasting device does not receive the request previously sent by the scan device, and therefore, the scan device should try a higher transmit power.

Figure 7B:
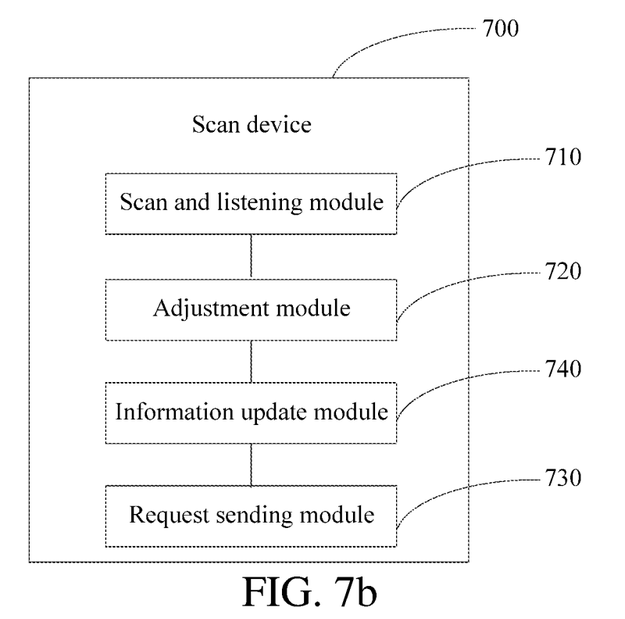
FIG. 7b is a schematic structural diagram of modules of another example scan device according to an embodiment of the present application.

Referring to FIG. 7*b*, in another embodiment of the present application, the scan device 700 may further comprise:

an information update module 740, configured to: when the first transmit power needs to be adjusted, update related information comprised in the request.

When the scan device sends the request to the broadcasting device for multiple times, if information about a connection establishment time and comprised in the request is not updated, in the case where a connection needs to be established, the scan device and the broadcasting device may need multiple connection attempts before successfully establishing a connection. Therefore, the related information herein may comprise the information about a connection establishment time.

The request sending module 730 sends, to the sender of the broadcasting packet according to the adjusted first transmit power, the request comprising the updated related information.

Figure 8A:
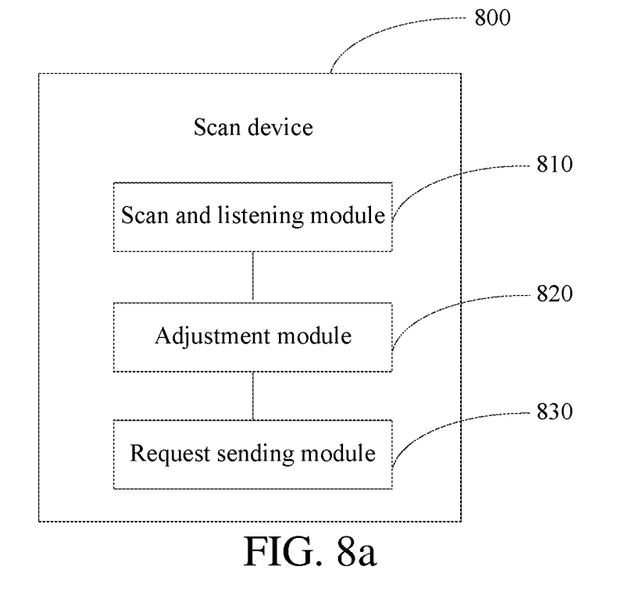
FIG. 8a is a schematic structural diagram of modules of an example scan device according to another embodiment of the present application.

FIG. 8*a* is a schematic structural diagram of modules of a scan device for wireless communication according to another embodiment of the present application. The scan device 800 may be a Bluetooth device, a ZigBee device, or the like, for example, the scan device 800 may be a Bluetooth headset, a smart phone, or a smart glass.

As shown in FIG. 8*a*, the scan device 800 may comprise: a scan and listening module 810, an adjustment module 820, and a request sending module 820.

The scan and listening module 810 is configured to perform scan and listen.

The adjustment module 820 is configured to: when scan and listening module 810 detects a broadcasting packet by means of listening, if a request has been sent to a sender of the broadcasting packet and information about a second transmit power and comprised in the broadcasting packet changes, adjust a first transmit power.

The request sending module 830 is configured to send the request to the sender of the broadcasting packet according to the adjusted first transmit power.

Specifically, in this embodiment, the request may be a connection request or a scan request.

Similar to the foregoing embodiment, in order to implement the method of the present application, it may be set that, for a common broadcasting device, when it does not receive any request and broadcasting times do not cause a broadcasting event to end, the broadcasting device continues to send the broadcasting packet by using an unchanged power; and for a broadcasting device capable of adjusting a power, as described in the present application, when it does not receive any request and broadcasting times do not cause a broadcasting event to end, the broadcasting device of the present application continues to send the broadcasting packet after increasing the power, and when it receives a request and broadcasting times do not cause the broadcasting event to end, the broadcasting device of the present application continues to send the broadcasting packet after decreasing the power.

Therefore, when the scan device receives the broadcasting packet from the broadcasting device again after sending the request to the broadcasting device (that is, the broadcasting packet from the same broadcasting device is received at least twice), and the transmit power of the broadcasting packet changes, it indicates that the broadcasting device receives the request, and is adjusting the transmit power.

In this embodiment, the broadcasting packet comprises information about a second transmit power, that is, comprises information about a transmit power of the broadcasting packet; after receiving the broadcasting packet, the scan device reads the information about the second transmit power in the broadcasting packet, and if the information about the second transmit power changes, it indicates that the broadcasting device expects to obtain, by adjusting the transmit power, a reference working power that can ensure communication and is close to a minimum power of the broadcasting device. In this case, the scan device may also adjust the first transmit power, so that the first transmit power is closer to a minimum power of the scan device.

During adjustment on the first transmit power, the adjustment module 820 may adjust the first transmit power according to a change trend of the second transmit power. For example, when the second transmit power decreases, the first transmit power is decreased, and when the second transmit power increases, the first transmit power is increased. When the second transmit power decreases, it indicates that the broadcasting device receives the request previously sent by the scan device, and therefore, the scan device may try a lower transmit power; when the second transmit power increases, it indicates that the broadcasting device does not receive the request previously sent by the scan device, and therefore, the scan device should try a higher transmit power.

Figure 8B:
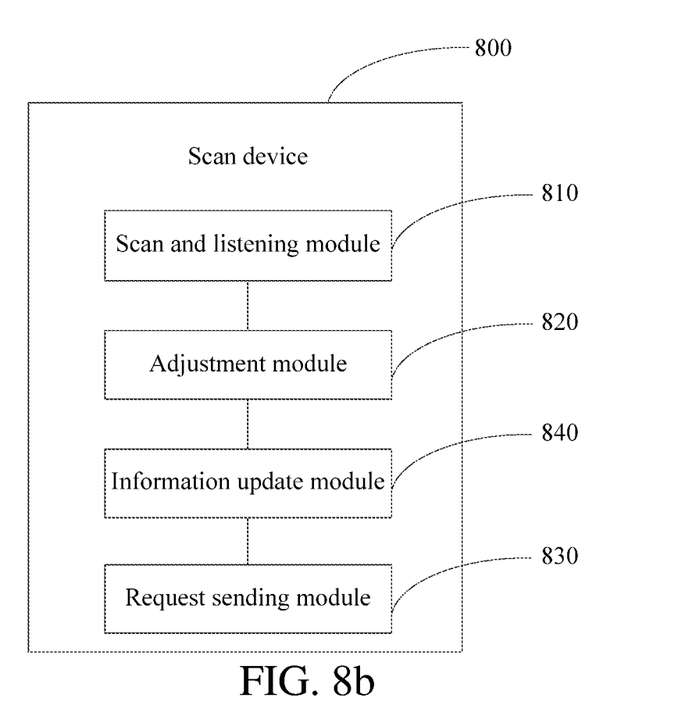
FIG. 8b is a schematic structural diagram of modules of another example scan device according to another embodiment of the present application.

Referring to FIG. 8*b*, in another embodiment of the present application, the scan device 800 may further comprise:

an information update module 840, configured to: when the first transmit power needs to be adjusted, update related information comprised in the request.

When the scan device sends the request to the broadcasting device for multiple times, if information about a connection establishment time and comprised in the request is not updated, in the case in which a connection needs to be established, the scan device and the broadcasting device may need multiple connection attempts before successfully establishing a connection. Therefore, the related information herein may comprise the information about a connection establishment time.

The request sending module 830 sends, to the sender of the broadcasting packet according to the adjusted first transmit power, the request comprising the updated related information.

Figure 9:
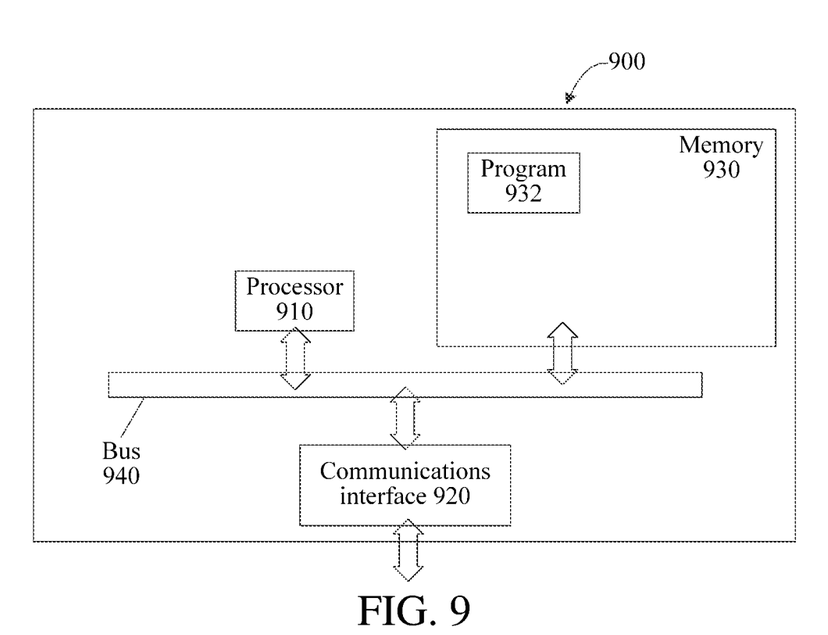
FIG. 9 is a hardware schematic structural diagram of a broadcasting device according to an embodiment of the present application.

A hardware structure of the broadcasting device of this embodiment is shown in FIG. 9. The specific embodiment of the present application does not limit the specific implementation of the broadcasting device. Referring to FIG. 9, the broadcasting device 900 may comprise:

a processor 910, a communications interface 920, a memory 930, and a communication bus 940.

The processor 910, the communications interface 920, and the memory 930 communicate with each other through the communication bus 940.

The communications interface 920 is configured to communicate with another network element such as a scan device.

The processor 910 is configured to execute a program 932, and specifically may execute related steps in the method embodiment shown in FIG. 3.

Specifically, the program 932 may comprise program code, and the program code comprises a computer operation instruction.

The processor 910 may be a central processing unit (CPU) or an application specific integrated circuit (ASIC), or configured as one or more integrated circuits for implementing an embodiment of the present application.

The memory 930 is configured to store the program 932. The memory 930 may comprise a high-speed random access memory (RAM), and may also comprise a non-volatile memory, for example, at least one magnetic disk memory. The program 932 specifically may execute the following steps:

a broadcasting and listening step: sending a broadcasting packet by using a current power and listening;

a power decreasing step: when a request is detected by means of listening, recording the current power as a historical power, and decreasing the current power; and a power determining step: determining whether a current broadcasting event is ended, if the current broadcasting event is ended, determining the historical power as a reference working power, and otherwise, returning to the broadcasting and listening step.

For specific implementation of each step in the program 932, reference may be made to a corresponding step or module in the foregoing embodiment, and description is not repeated herein. It can be clearly understood by persons skilled in the art that, to make the description convenient and concise, for specific working processes of the device and modules described above, reference may be made to descriptions of corresponding processes in the foregoing method embodiment, and description is not repeated herein.

Figure 10:
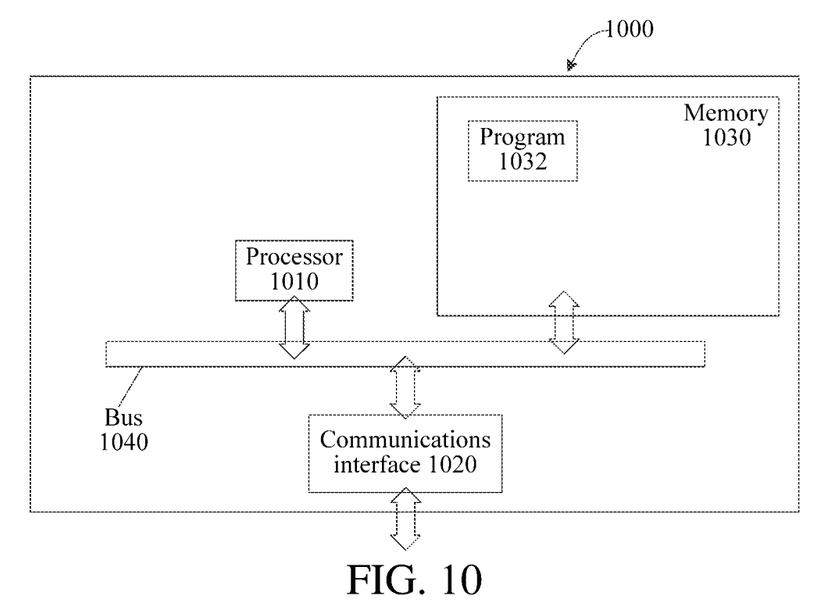
FIG. 10 is a hardware schematic structural diagram of a scan device according to an embodiment of the present application.

A hardware structure of the scan device according to this embodiment is shown in FIG. 10. The specific embodiment of the present application does not limit the specific implementation of the scan device. Referring to FIG. 10, the scan device 1000 may comprise:

a processor 1010, a communications interface 1020, a memory 1030, and a communication bus 1040.

The processor 1010, the communications interface 1020, and the memory 1030 communicate with each other through the communication bus 1040.

The communications interface 1020 is configured to communicate with another network element such as a broadcasting device.

The processor 1010 is configured to execute a program 1032, and specifically may execute related steps in the method embodiment shown in FIG. 1.

Specifically, the program 1032 may comprise program code, where the program code comprises a computer operation instruction.

The processor 1010 may be a CPU or an ASIC, or configured as one or more integrated circuits for implementing an embodiment of the present application.

The memory 1030 is configured to store the program 1032. The memory 1030 may comprise a high-speed RAM, and may also comprise a non-volatile memory, for example, at least one magnetic disk memory. The program 1032 specifically may execute the following steps:

a scan and listening step: performing scan and listening;

an adjustment step: when a broadcasting packet is detected by means of listening, if a request has been sent to a sender of the broadcasting packet and a received signal strength of the broadcasting packet changes, adjusting a first transmit power; and a request sending step: sending the request to the sender of the broadcasting packet according to the adjusted first transmit power.

Alternatively, the program 1032 specifically may execute the following steps:

a scan and listening step: performing scan and listening;

an adjustment step: when a broadcasting packet is detected by means of listening, if a request has been sent to a sender of the broadcasting packet and information about a second transmit power and comprised in the broadcasting packet changes, adjusting a first transmit power; and a request sending step: sending the request to the sender of the broadcasting packet according to the adjusted first transmit power.

For specific implementation of each step in the program 1032, reference may be made to a corresponding step or module in the foregoing embodiment, and description is not repeated herein. It can be clearly understood by persons skilled in the art that, to make the description convenient and concise, for specific working processes of the device and modules described above, reference may be made to descriptions of corresponding processes in the foregoing method embodiment, and description is not repeated herein.

Those of ordinary skill in the art may realize that, the exemplary units and method steps described with reference to the embodiments disclosed in this specification can be implemented by electronic hardware, or a combination of computer software and electronic hardware. Whether these functions are implemented as hardware or software depends upon the particular application and design constraint conditions of the technical solution. Persons skilled in the art can use different methods to achieve the described functions for each particular application, but it should not be considered that such implementation goes beyond the scope of the present application.

If implemented in the form of a software functional unit and sold or used as an independent product, the functions can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for instructing a computer device (for example, a personal computer, a controller, or a network device) to execute all or some steps of the method described in each embodiment of the present application. The foregoing storage medium comprises various media capable of storing program code, such as a USB flash disk, a removable hard disk drive, a read-only memory (ROM), a RAM, a magnetic disk, or an optical disc.

The above example embodiments are only used to describe the present application, instead of limiting the present application; various modifications and variations can be made by those of ordinary skill in the art without departing from the spirit and scope of the present application. Therefore, all equivalent technical solutions also belong to the scope of the present application, and the patent protection scope of the present application should be subject to the claims.

What is claimed is:

1. A method, comprising:
    sending, by a device comprising a processor, a broadcasting packet by using a current power and listening;
    when a request is detected by the listening, recording the current power as a historical power, and decreasing the current power; and
    determining whether a current broadcasting event is ended, and, in response to the current broadcasting event being determined to have ended, determining the historical power as a reference working power, and otherwise, returning to the broadcasting and the listening.

2. The method of claim 1, wherein the decreasing the current power comprises decreasing the current power according to a defined set of power adjustment rules.

3. The method of claim 1, further comprising:
    when no request is detected by the listening after a defined period of time, increasing the current power.

4. The method of claim 3, wherein the increasing the current power comprises increasing the current power according to a defined set of power adjustment rules.

5. The method of claim 3, wherein, when the historical power exists, the current power is increased to less than or equal to the historical power.

6. The method of claim 2, wherein the defined set of power adjustment rules comprises at least one of a defined set of dynamic programming rules, a defined set of prediction rules, and a defined set of search rules.

7. The method of claim 1, wherein the broadcasting packet comprises a defined set of power adjustment rules.

8. The method of claim 2, wherein the decreasing the current power further comprises:
    modifying the defined set of power adjustment rules according to the request.

9. The method of claim 1, wherein the request is a connection request or a scan request.

10. The method of claim 1, wherein the wireless communication is Bluetooth communication or a ZigBee communication.

11. A device, comprising:
    a memory that stores executable modules; and
    a processor, coupled to the memory, that executes the executable modules to perform operations of the apparatus, the executable modules comprising:
        a broadcasting and listening module configured to send a broadcasting packet by using a current power and listening;
        a power decreasing module configured to, in response to the broadcasting and listening module detecting a request via the listening, record the current power as a historical power, and decrease the current power; and
        a power determining module configured to determine whether a current broadcasting event has ended, and in response to the current broadcasting event being determined to have ended, determine the historical power as a reference working power.

12. The device of claim 11, wherein the executable modules further comprise:
    a power increasing module configured to, in response to the broadcasting and listening module not detecting any request via the listening, increase the current power.

13. The device of claim 11, wherein the broadcasting device is a Bluetooth device or a ZigBee device.

14. A computer readable storage device, comprising at least one executable instruction, which, in response to execution, causes a device comprising a processor to perform operations, comprising:
    sending a broadcasting packet by using a current power and listening;
    when a request is detected by means of listening, recording the current power as a historical power, and decreasing the current power; and
    determining whether a current broadcasting event has ended, and if the current broadcasting event has ended, determining the historical power as a reference working power, and otherwise, returning to the sending.

15. A device, comprising a processor and a memory, the memory storing executable instructions, the processor being connected to the memory through a communication bus, and when the broadcasting device for wireless communications operates, the processor executes the executable instructions stored in the memory, causing the device to perform operations, comprising:

sending a broadcasting packet by using a current power and listening;

when a request is detected by way of the listening, recording the current power as a historical power, and decreasing the current power; and determining whether a current broadcasting event has ended, in response to the current broadcasting event being determined to have ended, determining the historical power as a reference working power, and otherwise, returning to the sending.

\* \* \* \* \*